United States Patent
Koshy et al.

(10) Patent No.: US 7,433,469 B2
(45) Date of Patent: Oct. 7, 2008

(54) APPARATUS AND METHOD FOR IMPLEMENTING THE KASUMI CIPHERING PROCESS

(75) Inventors: Kamal J. Koshy, Milpitas, CA (US); Jaroslaw J. Sydir, San Jose, CA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 10/833,967

(22) Filed: Apr. 27, 2004

(65) Prior Publication Data

US 2005/0238166 A1 Oct. 27, 2005

(51) Int. Cl.
*H04L 1/00* (2006.01)
(52) U.S. Cl. .......................................... 380/28; 380/37
(58) Field of Classification Search .................... 380/37, 380/28
See application file for complete search history.

(56) References Cited

U.S. PATENT DOCUMENTS 7,212,631 B2 * 5/2007 Averbuj et al. ................. 380/37
2002/0178358 A1 11/2002 Perkins et al.
2002/0186841 A1 12/2002 Averbuj et al.
2003/0007636 A1 * 1/2003 Alves et al. ................... 380/37

OTHER PUBLICATIONS

Specification of the 3GPP Confidentiality and Integrity Algorithms, Document 2 KASUMI Specification, Dec. 23, 1999.*
On the Hardware Implementation of the 3GPP Confidentiality and Integrity Algorithms, Marinis et al, 2001.*
Hank Dietz "Linux Parallel Processing Howto", 1996.*
"3rd Generation Partnership Project; Technical Specification Group Services and System Aspects; 3G Security; Specification of the 3GPP Confidentiality and Integrity Algorithms; Document 2: KASUMI Specification,".
Release 5, 3GPP TS 35.202, V5.0.0, Jun. 2002, pp. 1-24, 3GPP Organizational Partners, Valbonne, France.
International Patent Application No. PCT/US2005/012090 filed Apr. 8, 2005; Int'l Preliminary Report on Patentability dated Nov. 9, 2006.
PCT ISR WO dated Aug. 4, 2005.

* cited by examiner

*Primary Examiner*—Andrew L Nalven
(74) *Attorney, Agent, or Firm*—Guojun Zhou

(57) ABSTRACT

An arrangement is provided for performing the KASUMI ciphering process. The arrangement includes apparatuses and methods that parallelize computations of two FI functions in KASUMI rounds within one clock cycle and computes two consecutive FL functions in the KASUMI rounds within one clock cycle.

23 Claims, 11 Drawing Sheets

APPARATUS AND METHOD FOR IMPLEMENTING THE KASUMI CIPHERING PROCESS

BACKGROUND

1. Field

The present invention relates generally to network security and, more specifically, to apparatuses and methods for performing KASUMI ciphering process.

2. Description

Networks enable computers and other devices to communicate. For example, networks can carry data representing video, audio, e-mail, and so forth. However, network systems are subject to many threats, including loss of privacy, loss of data integrity, identity spoofing, and denial-of-service attacks. To address these threats, many measures have been developed and employed to improve the security of network communications. For example, a standard offered by a consortium named "$3^{rd}$ Generation Partnership Project" (3GPP) provides a number of algorithms to improve confidentiality and integrity of network communications. Although the target of the 3GPP standard is mobile communications, its confidentiality and integrity algorithms apply to network communications in general. The heart of the 3GPP confidentiality and integrity algorithms is the KASUMI algorithm.

The KASUMI algorithm is a block cipher algorithm that produces a 64-bit output from a 64-bit input under the control of a 128-bit input key. It includes eight round computations. Although the KASUMI ciphering process can be implemented through software simulations, a hardware implementation of the ciphering process may be more desirable because of the higher processing speed of hardware solutions. It is advantageous when a ciphering process does not significantly slow down data processing speed for network communications. In a hardware implementation, a slow speed of KASUMI computations may require that more than one KASUMI module be used to improve the KASUMI processing speed so that the overall data processing speed of a network system will not be slowed down. More KASUMI modules require a larger physical area in a chip, and thus higher power consumption and higher costs. Therefore, it is desirable to improve the processing speed of a KASUMI hardware implementation.

BRIEF DESCRIPTION OF THE DRAWINGS

The features and advantages of the present invention will become apparent from the following detailed description of the present invention in which.

DETAILED DESCRIPTION

An embodiment of the present invention comprises an apparatus and method for implementing the KASUMI ciphering process. The KASUMI algorithm is a block cipher algorithm that produces a 64-bit output from a 64-bit input through eight round computations, under the control of a 128-bit key. Each round includes computations of one FL function and one FO function. An FO function includes three iterations of an FI function. A straightforward hardware implementation requires four clock cycles to complete each round with one cycle for computing the FL function and each cycle for computing one iteration of the FI function. Thus, it takes a total of 32 clock cycles to produce a KASUMI output. According to an embodiment of the present invention, the KASUMI ciphering process may be implemented in such a way that the eight KASUMI rounds may be unrolled to reduce the number of total cycles needed to complete the computation of the KASUMI ciphering process. Under such an embodiment, two consecutive FI functions, either in the same round or across two consecutive rounds, may be computed in parallel in one cycle, and two consecutive FL functions across two consecutive rounds may be computed in one cycle. Therefore, in one embodiment, only 17 cycles instead of 32 cycles may be needed to produce a KASUMI output.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
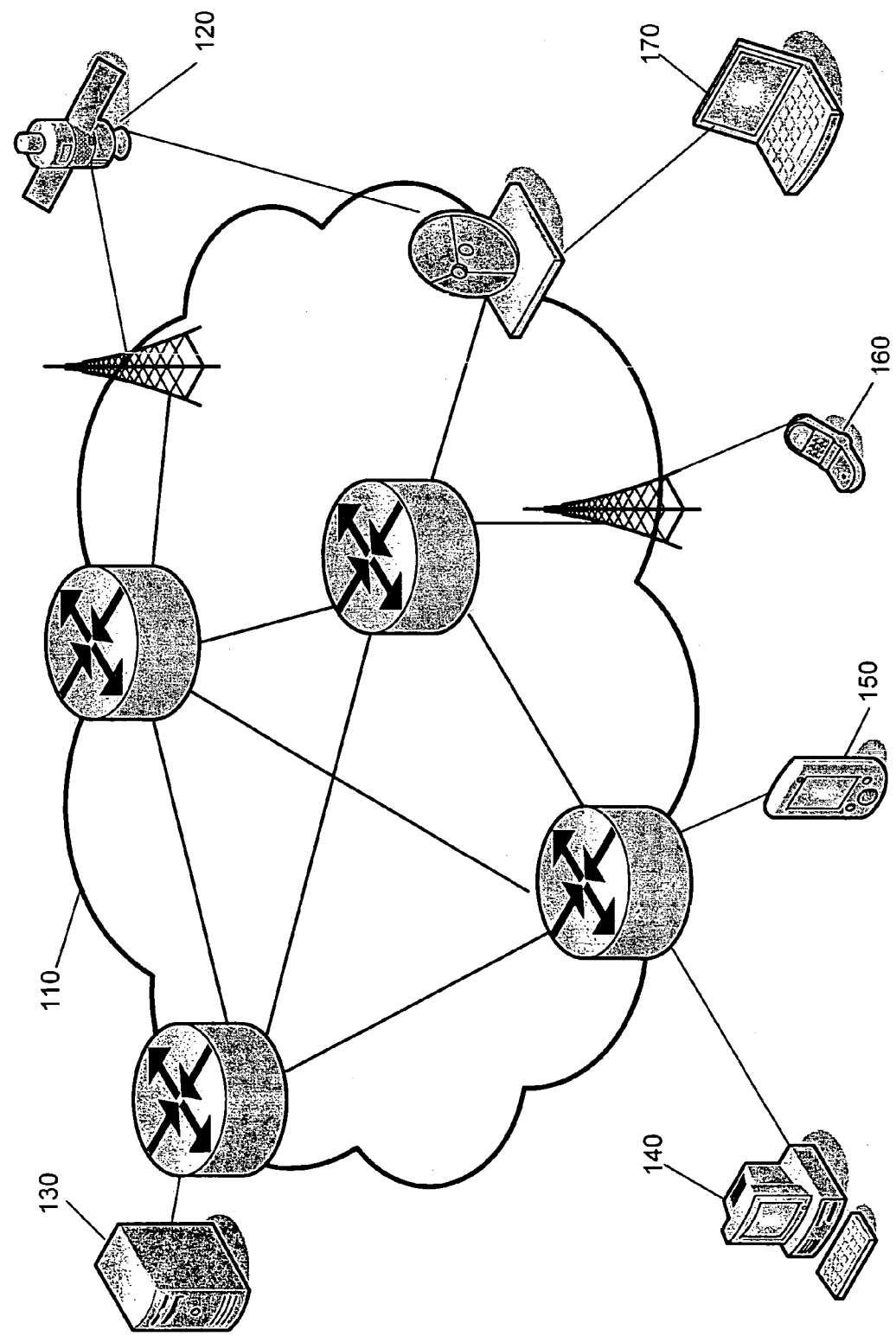
FIG. 1 is a diagram illustrating a general network system.

FIG. 1 depicts a general network system 110 that supports a number of terminals. The network system 110 may comprise a number of devices such as routers, switches, and bridges to facilitate data passage from one terminal to another. The network system may be a wireless system, an Ethernet system, any other systems, or a combination of different network systems. The network system may employ a satellite 120 to help connect one terminal to another terminal. The terminals of the network system may comprise servers (130), desktop computers (140), personal directory assistants (PDAs) (150), cell phones (160), laptop computers (170), or other devices. Data communicated among different terminals may include video, audio, messages, and other data. The network system may use the 3GPP standard for communication security. As a component of the 3GPP standard, the KASUMI ciphering process may be employed to encrypt data to ensure confidential communication and the integrity of communications.

Figure 2:
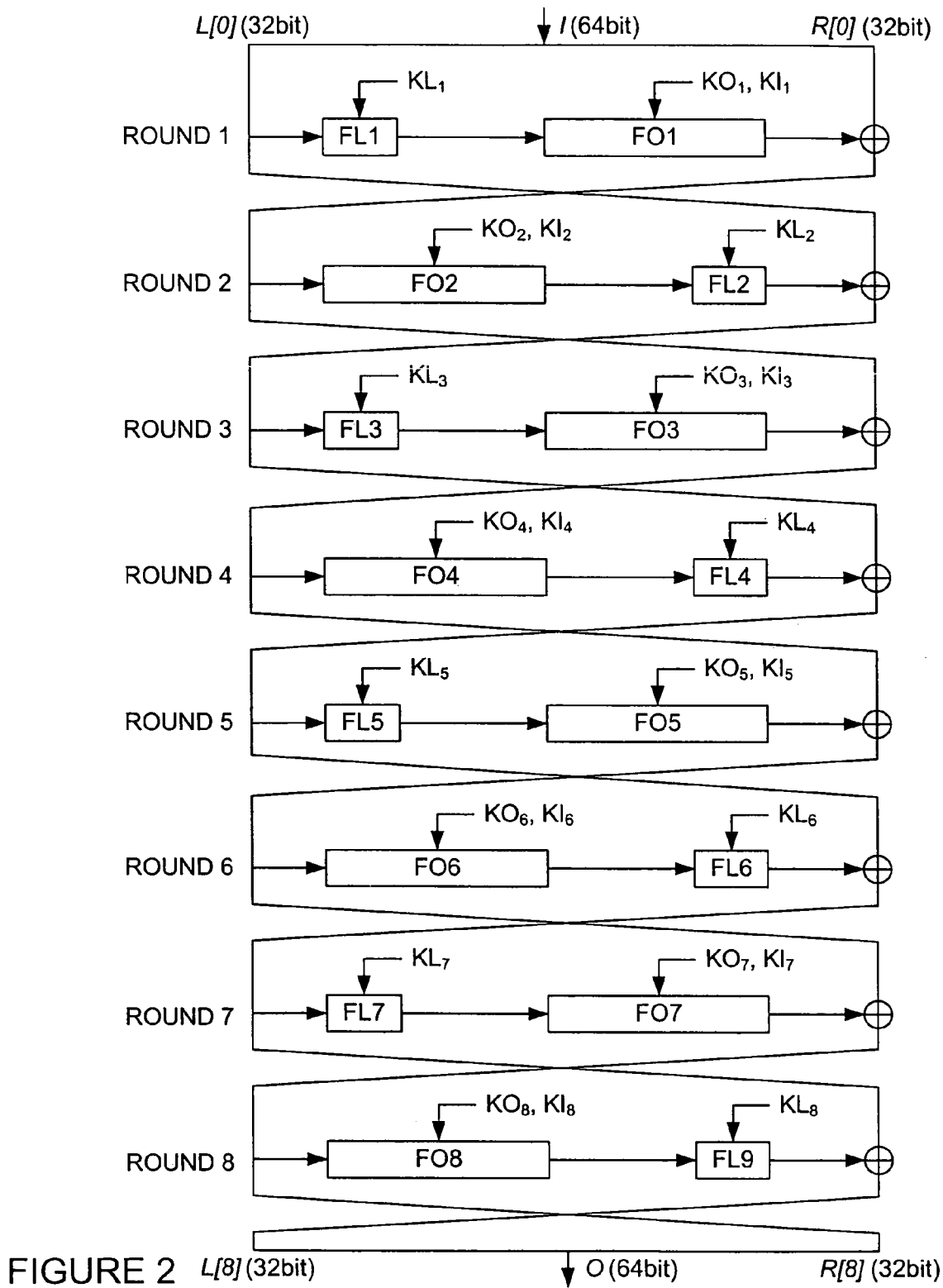
FIG. 2 is a diagram illustrating how the KASUMI ciphering process is performed.

FIG. 2 depicts the KASUMI ciphering process as defined in "Document 2: KASUMI Specification" of "Specification of the 3GPP Confidentiality and Integrity Algorithms," V5.0.0, June, 2002 (hereinafter the KASUMI specification). The KASUMI ciphering process takes a 64-bit input, I; performs eight round operations under the control of a 128-bit input key, K; and produces a 64-bit output, O. The input I is divided into two 32-bit strings, L[0] and R[0], with I=L[0]∥R[0], where "∥" denotes a concatenation operation. For each round, i (1<=i<=8), $$L[i]=R[i-1]\oplus F_i(L[i-1],RK[i]), \quad (1)$$

$$R[i]=L[i-1], \quad (2)$$

where RK[i] is a 128-bit round key for round i, which is derived from K in a manner specified in the KASUMI specification; and "⊕" denotes an exclusive-or ("XOR") operation. $F_i$ in Equation (1) denotes the round function that is defined as:

$$F_i(I,RK[i])=FO(FL(I,KL_i),KO_i,KI_i) \text{ for odd rounds}, \quad (3)$$

$$F_i(I,RK[i])=FL(FO(I,KO_i,KI_i),KL_i) \text{ for even rounds}, \quad (4)$$

where $KL_i$, $KO_i$ and $KI_i$ are sub-keys for round i, which is derived from the round key RK[i] as specified in the KASUMI specification. $KL_i$ is used with FL function and has 32 bits. $KO_i$ and $KI_i$ are used with FO function and each has 48 bits. As shown in Equations (3) and (4), the order of functions FO and FL is reversed between two consecutive rounds. The 64-bit output O of the KASUMI ciphering process is derived from two 32-bit outputs from the $8^{th}$ round, i.e., O=L[8]∥R[8]. FIG. 2 illustrates operations required for the KASUMI ciphering process. As shown in the FIG. 2, each round comprises operations of an FL function, an FO function, and an XOR function, although the order of FL and FO functions is reversed between two consecutive rounds.

Figure 3:
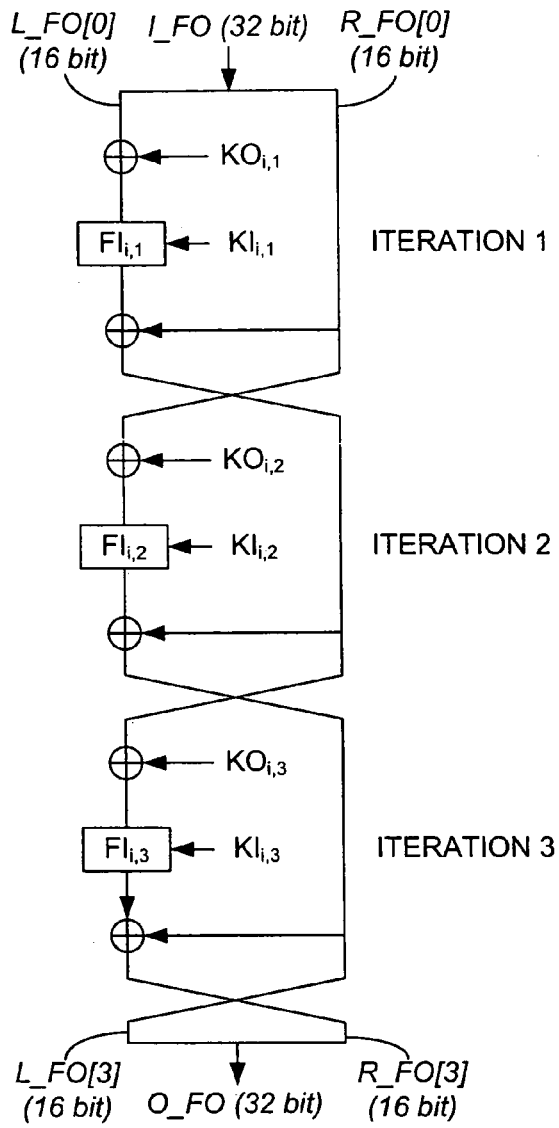
FIG. 3 is a diagram illustrating how the FO function in the KASUMI ciphering process is performed.

To compute an FO function for round i, a 32-bit input I_FO is split into two halves L_FO[0] and R_FO[0], with I_FO=L_FO[0]∥R_FO[0]. Each of the 48 bit sub-keys, $KO_i$ and $KI_i$ is also split into three 16 bit sub-sub-keys, with $KO_i=KO_{i,1}\|KO_{i,2}\|KO_{i,3}$ and $KI_i=KI_{i,1}\|KI_{i,2}\|KI_{i,3}$. The function FO includes three iterations of a set of operations. For each iteration j (1<=j<=3), $$R\_FO[j]=FI(L\_FO[j-1]\oplus KO_{i,j},KI_{i,j})\oplus R\_FO[j-1], \quad (5)$$

$$L\_FO[j]=R\_FO[j-1], \quad (6)$$

where FI is a function to be defined in the following. The FO function returns a 32-bit value, O_FO, which is the result of concatenation of two 16-bit outputs from the $3^{rd}$ iteration, i.e., O_FO=L_FO[3]∥R_FO[3]. FIG. 3 illustrates how an FO function for round i is computed. As shown in the figure, the computation of the FO function involves three iterations, with each iteration comprising two XOR functions and an FI function.

Figure 4:
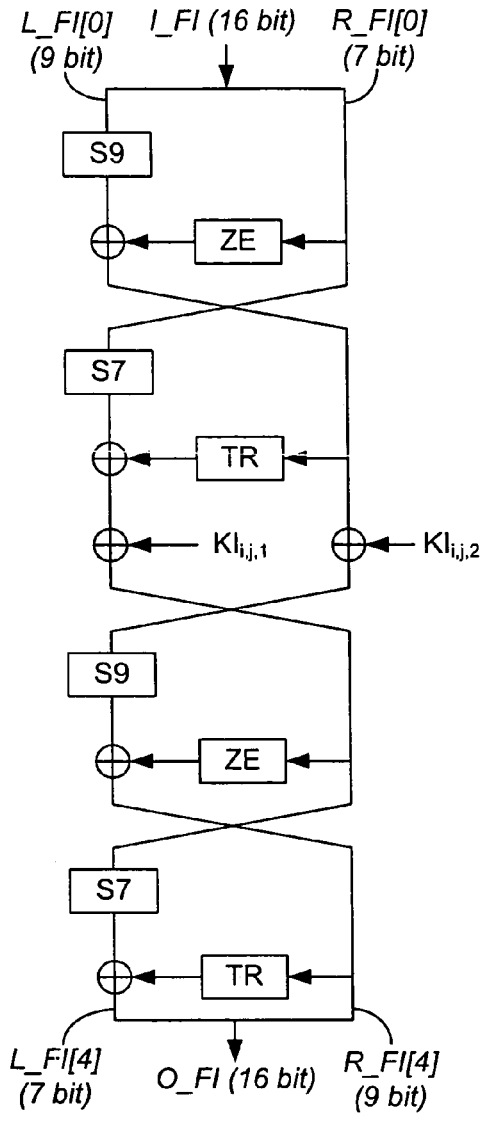
FIG. 4 is a diagram illustrating how the FI function in the FO function is performed.

To compute an FI function for iteration j of an FO function in round i, a 16 bit input I_FI is split into a 9 bit left half L_FI[0], and a 7 bit right half R_FI[0], with I_FI=L_FI[0]∥R_FI[0]. The sub-key $KI_{i,j}$ is split a 7 bit left component $KI_{i,j,1}$ and a 9 bit right component $KI_{i,j,2}$, with $KI_{i,j}=KI_{i,j,1}\|KI_{i,j,2}$. The FI function is defined as follows.

$$L\_FI[1]=R\_FI[0],$$

$$R\_FI[1]=S9(L\_FI[0])\oplus ZE(R\_FI[0]);$$

$$L\_FI[2]=R\_FI[1]\oplus KI_{i,j,2},$$

$$R\_FI[2]=S7(L\_FI[1])\oplus TR(R\_FI[1])\oplus KI_{i,j,1};$$

$$L\_FI[3]=R\_FI[2],$$

$$R\_FI[3]=S9(L\_FI[2])\oplus ZE(R\_FI[2]);$$

$$L\_FI[4]=S7(L\_FI[3])\oplus TR(R\_FI[3]),$$

$$R\_FI[4]=R\_FI[3];$$

where S7 is a function that transforms a 7 bit input to a 7 bit output; S9 is a function that transforms a 9 bit input to a 9 bit output; ZE is a function that takes a 7 bit input and converts it to a 9 bit output by adding two zero bits to the most-significant end; and TR is a function that takes a 9 bit input and converts it to a 7 bit output by discarding the two most-significant bits. The S7 and S9 functions are defined in detail in the KASUMI specification. The internal operations of an FI function, as described in the equations above, are illustrated in FIG. 4.

Figure 5:
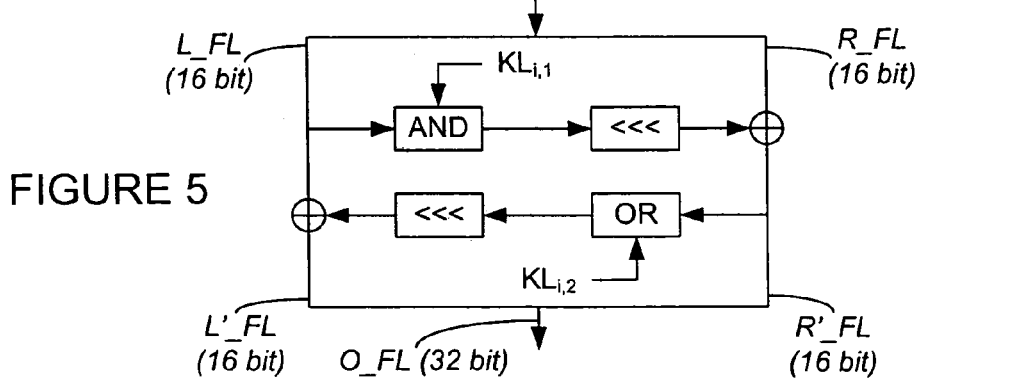
FIG. 5 is a diagram illustrating how the FL function in the KASUMI ciphering process is performed.

To compute the FL function for a KASUMI round i, a 32 bit input data, I_FL, is split into a 16 bit left half, L_FL, and a 16 bit right half, R_FL, with I_FL=L_FL∥R_FL. The sub-key, $KL_i$, is also split into two 16 bit halves, with $KL_i=KL_{i,1}\|KL_{i,2}$. The following operations are performed in the FL function:

$$R'\_FL=R\_FL\oplus ROL(L\_FL\cap KL_{i,1}), \quad (7)$$

$$L'\_FL=L\_FL\oplus ROL(R'\_FL\cup KL_{i,2}), \quad (8)$$

where ROL is a function that rotates an input data of the function in the left direction by 1 bit; "∩" denotes a bit-wise AND operation; and "∪" denotes a bit-wise OR operation. The FL function returns a 32 bit output data, O_FL, by concatenating a right half output, R'_FL, and a left half output, L'_FL, i.e., O_FL=L'FL∥R'_FL. The internal operations of an FL function, as described in Equations (7) and (8), are illustrated FIG. 5.

Figure 6:
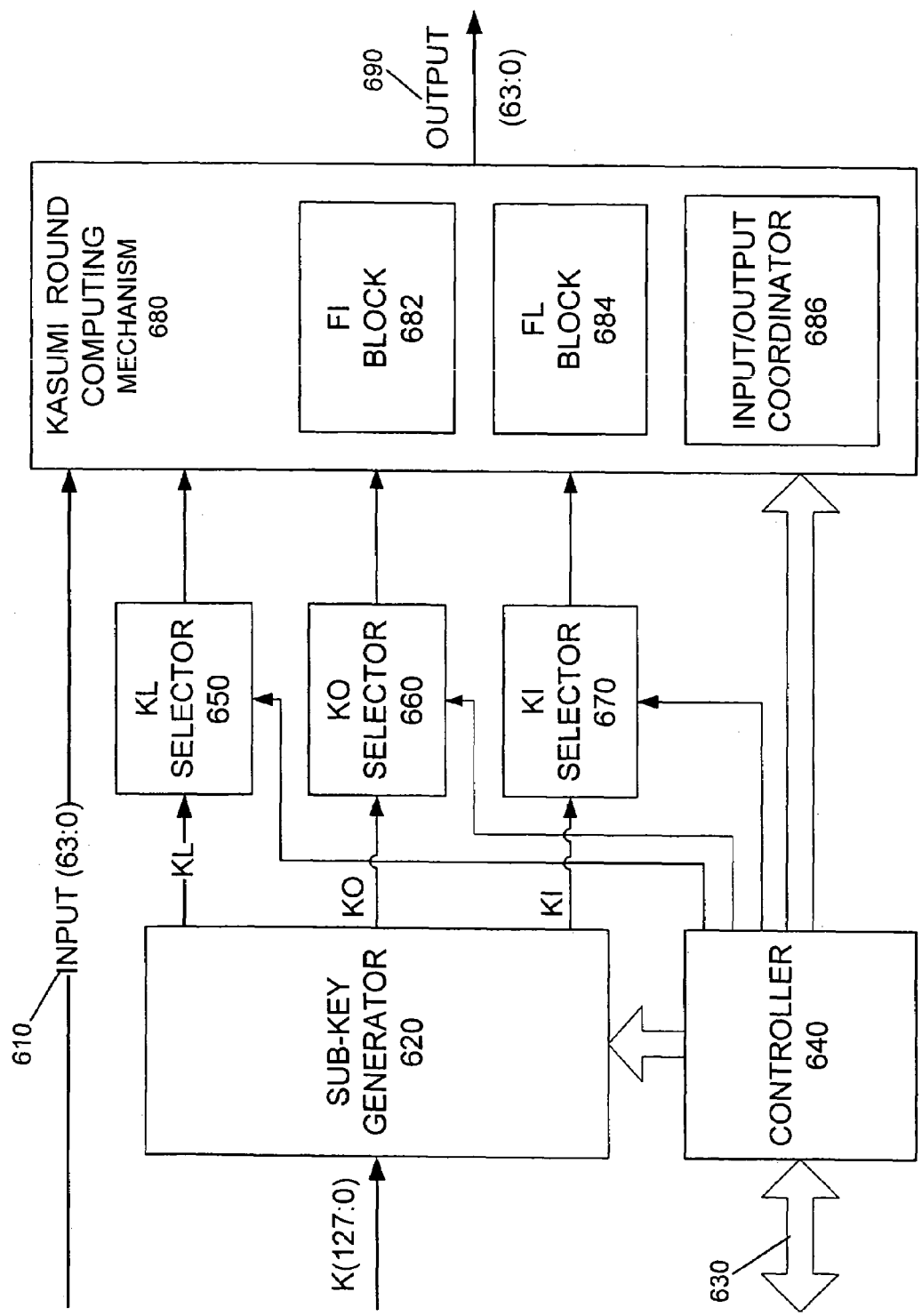
FIG. 6 is a block diagram of a system that implements the KASUMI ciphering process.

FIG. 6 depicts one example system that implements the KASUMI ciphering process. This system comprises a sub-key generator 620, a controller 640, a KL selector 650, a KO selector 660, a KI selector 670, and a KASUMI round computing mechanism 680. The sub-key generator 620 generates sub-keys, KL, KO, and KI, for each KASUMI round based on the 128 bit input key, K, according to the KASUMI specification. The input key may be generated from a public or a private key. Although the sub-key generator may generate a set of sub-keys needed for a KASUMI round at the time computation of that round is started in the KASUMI round computing mechanism, it is desirable for the sub-key generator to pre-generate the set of sub-keys needed for the KASUMI round before the computation of that round is even started to improve the overall speed of the system.

The controller 640 coordinates and controls operations among the sub-key generator, the KL selector, the KO selector, the KI selector, and the KASUMI round computing mechanism. For example, the controller may direct the sub-key generator to make sub-keys ready for a KASUMI round, i; the sub-key generator may notify the controller when the required sub-keys are ready to use; and upon receiving such a notification, the controller may control the selectors to provide the KASUMI round computing mechanism correct sub-keys and direct the KASUMI round computing mechanism to compute round i. When round i is completed, the KASUMI round computing mechanism may notify the controller so that the controller can direct the sub-key generator to prepare sub-keys for round i+1. Additionally, the controller may receive/send coordinating signals 630 from/to a processor. The coordinating signals may comprise a reset signal to reset the system, a start signal to start the system, and a done signal to inform the processor that the KASUMI ciphering has been completed.

The KL selector 650 selects KL sub-keys for the FL function computation in each KASUMI round. The KO selector 660 selects KO sub-keys for computation of three FI functions in each KASUMI round. The KI selector selects KI sub-keys for computation of three FI functions in each KASUMI round. Although these KL, KO, KI selectors are shown separate from each other and from the sub-key generator in FIG. 6, they may be combined partially or entirely, or some or all of them may be combined with the sub-key generator to perform the same or similar functions.

The KASUMI round computing mechanism 680 accepts a 64 bit input data 610 and computes eight KASUMI rounds for the input data using sub-keys provided by the sub-key generator to produce a 64 bit output data 690. The KASUMI round computing mechanism comprises an FI block 682, an FL block 684, and an input/output coordinator 686. The FI block 682 is capable of computing all FI functions in the eight KASUMI rounds. The FL block 684 is capable of computing all FL functions required by the KASUMI ciphering process. The input/output coordinator 686 may split the input data into two halves to start the first KASUMI round calculation and may combine two 32 bit output results from the eighth KASUMI round to produce the final 64 bit output data 690. The input/output coordinator may also split input data and combine the output data for each FI function. Because all FI functions in the eight KASUMI rounds include the same operations (each FI function operates with its own input data and specific sub-keys), it is possible for the FI block to include components that perform only one set of operations specified in the definition of the FI function. The data flow from one FI function to a subsequent FI function or FL function can be facilitated by the input/output coordinator as well as the controller 640. Similarly, the FL block may only include components that perform one set of operations specified in the definition of the FL function, with the input/output coordinator 686 and the controller 640 facilitating data flow between two consecutive FL functions or between an FL function and an FI function.

Figures 7A, 7B:
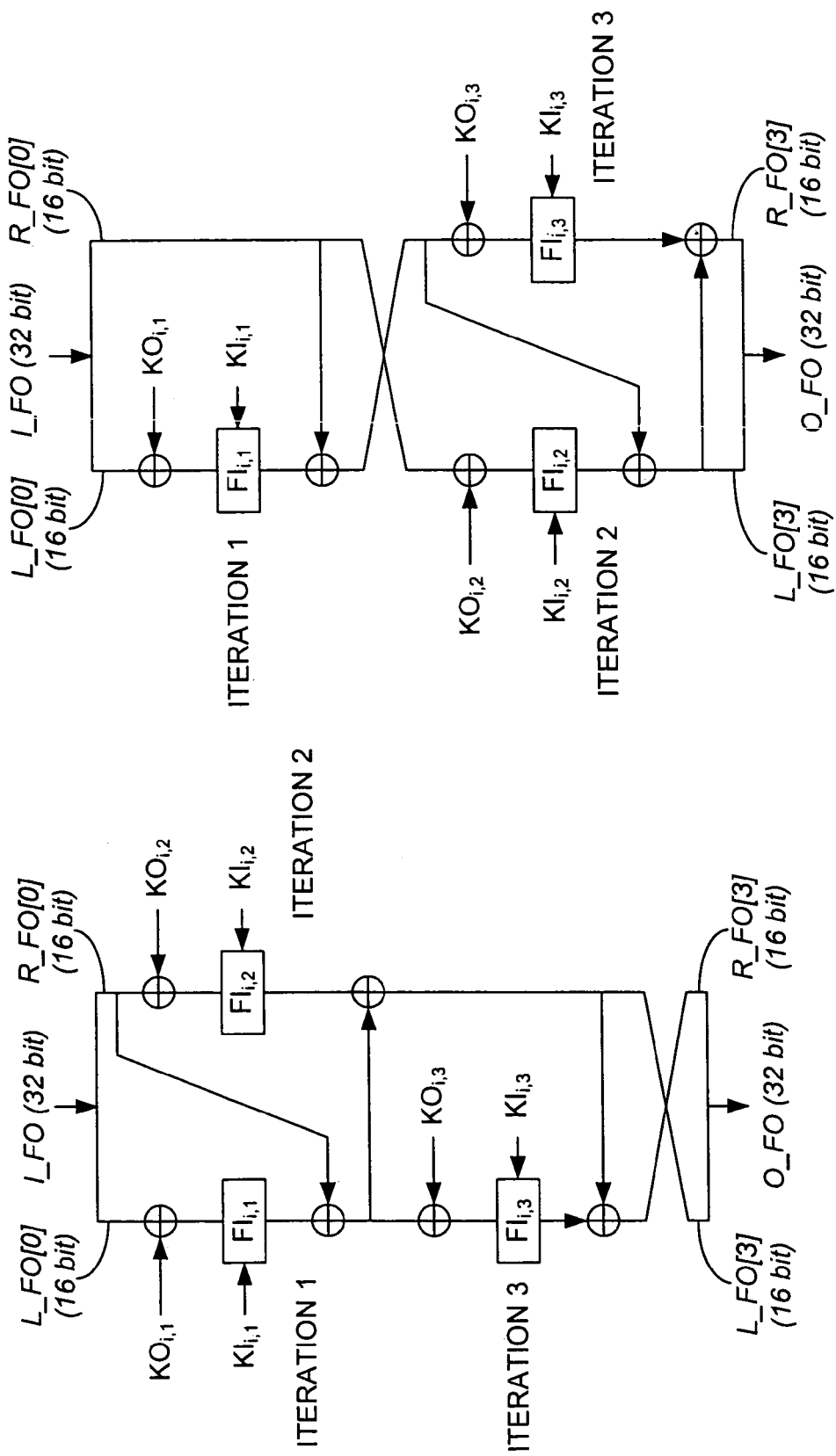
FIGS. 7(a)-(b) are diagrams illustrating how two sequential FI functions in a KASUMI round are performed in parallel.
Figure 8:
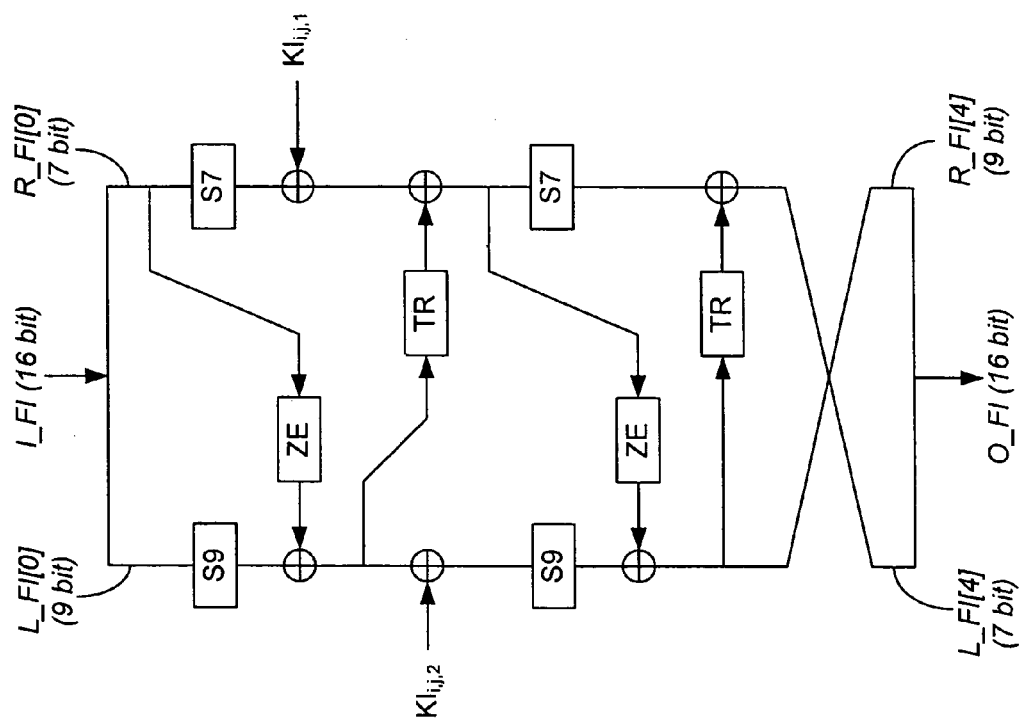
FIG. 8 is a diagram of an example implementation of the FI function.

The KASUMI ciphering process has a number of characteristics which may be exploited in a hardware implementation. For example, operations of two consecutive FI functions in the FO function of each KASUMI round, as shown in FIG. 3, may be carried in parallel. FIG. 7(a) depicts how $FI_{i,1}$ and $FI_{i,2}$ operations in FIG. 3 can be carried out in parallel. Because iteration 2 (for $FI_{i,2}$ operations) does not use the result from iteration 1 (for $FI_{i,1}$ operations), iteration 1 and iteration 2 may be carried out at the same time. However, iteration 3 (for $FI_{i,3}$ operations) may not be simply carried out in parallel with both iteration 1 and iteration 2 because iteration 3 needs to use the result from iteration 1 as its input. Similarly, $FI_{i,2}$ and $FI_{i,3}$ operations can be carried out in parallel as shown in FIG. 7(b). Additionally, the S7 and S9 operations in the FI function, as shown in FIG. 4, may be carried out in parallel. FIG. 8 depicts how S7 and S9 operations may be performed in parallel.

Figure 9:
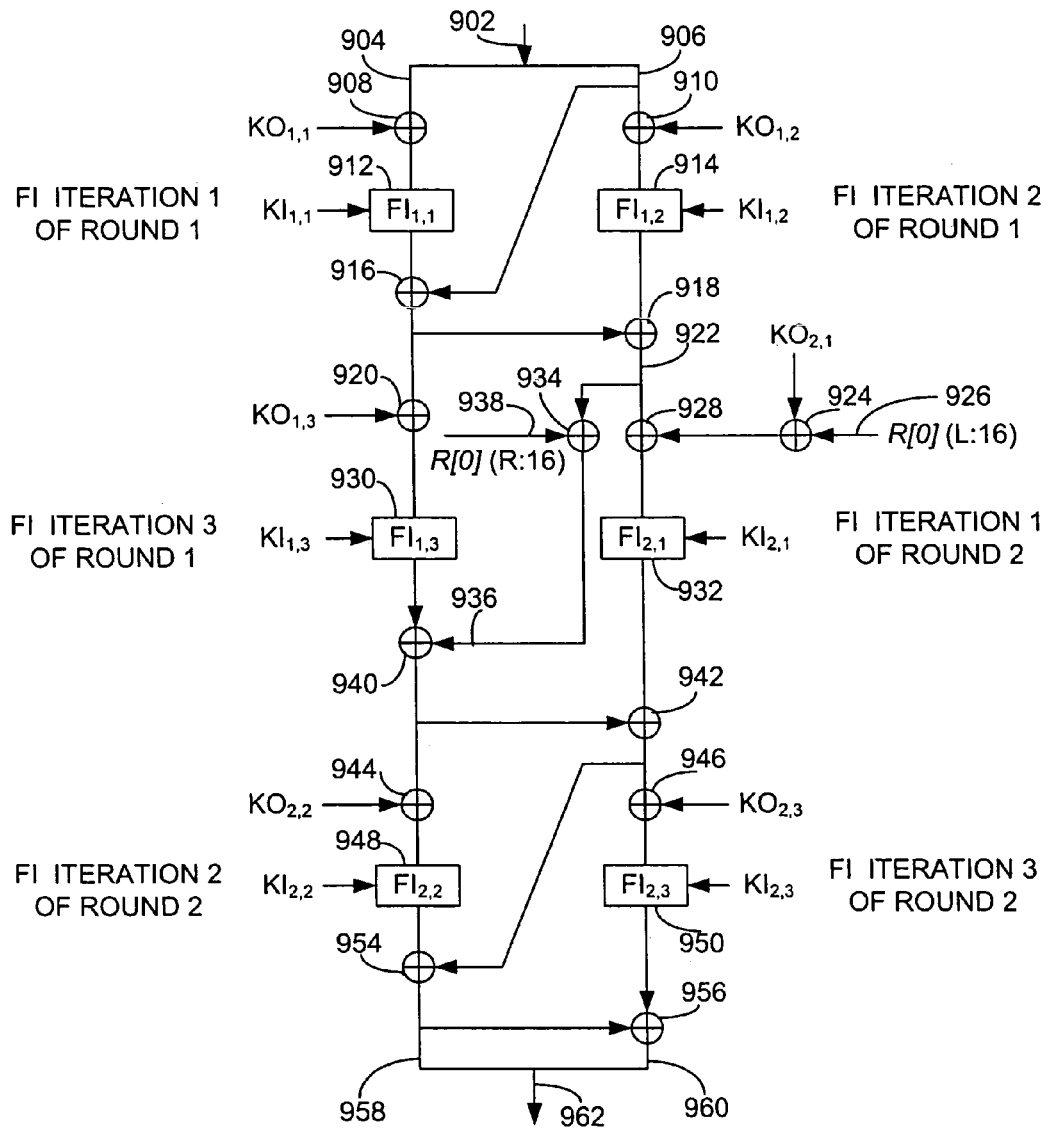
FIG. 9 is a diagram of an example implementation of FI functions in two consecutive KASUMI rounds.

Not only can two consecutive FI functions within a KASUMI round can be performed in parallel ("within-round FI parallelization"), as shown in FIGS. 7(a) and 7(b), but also two consecutive FI functions across two KASUMI rounds can be performed in parallel ("cross-round FI parallelization"). According to the definition of the KASUMI ciphering process as shown in FIG. 2, the only places where cross-round FI parallelization can be carried out are between round 1 and round 2, between round 3 and round 4, between round 5 and round 6, and between round 7 and round 8, because two cross-round consecutive FI functions only exist at these places. FIG. 9 illustrates how cross-round FI parallelization may be performed between round 1 and round 2. A 32 bit input data 902 is split into two 16 bit halves: the left half data 904 and the right half data 906. The left half data 904 is XORed with sub-key $KO_{1,1}$ through XOR mechanism 908. The output data from XOR mechanism 908 is used as the input for mechanism 912 that performs the FI function, $FI_{1,1}$, in FI iteration 1 of round 1. The $FI_{1,1}$ operations are carried out using sub-key $KI_{1,1}$. The result from the $FI_{1,1}$ operations are XORed with the right half data 906. Operations in FI iteration 2 of round 1 are performed in parallel with operations in FI iteration 1 of round 1. The right half data 906 is first XORed with sub-key $KO_{1,2}$ through XOR mechanism 910. The output data from XOR mechanism 910 is used as the input for mechanism 914 that performs the FI function, $FI_{1,2}$, in FI iteration 2 of round 1. The result from the $FI_{1,2}$ operations, which are carried out using sub-key $KI_{1,2}$, is further XORed with the output data from XOR mechanism 916 to produce an output data 922.

After the within-round FI parallelization (FI iteration 1 and FI iteration 2 of round 1) has been performed, the cross-round FI parallelization (FI iteration 3 of round 1 and FI iteration 1 of round 2) may start. However, there is a difference between within-round parallelization and cross-round parallelization, that is, there is an extra XOR operation between round 1 and round 2 (i.e., the XOR operation between FO1 and FO2 as shown in FIG. 2). Such a difference may require that within-round FI parallelization and cross-round parallelization be implemented differently and thus may increase hardware complexity. Therefore, it is desirable to have one mechanism to implement both within-round FI parallelization and cross-round FI parallelization. This requires that the extra XOR operation be handled specially. FIG. 9 illustrates one example way that handles the extra XOR operation between two rounds when implementing cross-round FI parallelization. Because an XOR operation is a bit-wise operation, the extra XOR operation between round 1 and round 2, which is a 32 bit operation with one input being the right half of the input data to the KASUMI ciphering process, R[0], can be replaced with two 16 bit XOR operations, performed by XOR mechanisms 924 and 934, respectively. XOR mechanism 924 has the left half 16 bits of R[0] ("R[0] (L:16)") as one of its inputs, and XOR mechanism 934 has the right half 16 bits of R[0] ("R[0] (R:16)") as one of its inputs. Because of the "interchangability" characteristic of an XOR operation, i.e., $(x \oplus y) \oplus z = x \oplus (y \oplus z)$, R[0] (L:16) can be pre-XORed with sub-key $KO_{2,1}$ through XOR mechanism 924, before data 922 even becomes available. In other words, XOR mechanism 924 is not in the critical path of FI iteration 1 of round 2. Similarly, R[0] (R:16) can be pre-XORed with data 922 through XOR mechanism 934, as soon as data 922 becomes available. Hence, XOR mechanism 934 is not in the critical path of FI iteration 3 of round 1. Using pre-XORing approach, a mechanism used to perform within-round FI parallelization may be used to perform the cross-round FI parallelization, with two additional XOR mechanisms.

By pre-XORing the extra XOR operation between round 1 and round 2, operations involved in FI iteration 3 of round 1 and FI iteration 1 of round 2 are similar to those involved in FI iterations 1 and 2 of round 1. On the left side, operations for FI iteration 3 of round1 start with XOR mechanism 920, which performs an XOR operation between output data of XOR mechanism 916 and sub-key $KO_{1,3}$. The output data from XOR mechanism 920 is used by mechanism 930 to perform $FI_{1,3}$ function under the control of sub-key $KI_{1,3}$. The result of $FI_{1,3}$ operations is further XORed with the output data 936 from XOR mechanism 934 through XOR mechanism 940. On the right side, operations for FI iteration 1 of round 2 start with XOR mechanism 928, which performs an XOR operation between the output data 922 from XOR mechanism 918 and the output data from XOR mechanism 924. The result from XOR mechanism 928 is used by mechanism 932 to perform $FI_{2,1}$ operations under the control of sub-key $KI_{2,1}$. The output data from mechanism 932 is further XORed with the output data from XOR mechanism 940 to complete the cross-round FI parallelization between FI iteration 3 of round 1 and FI iteration 1 of round 2.

The rest of the operations in the FO function of round 2 may be performed through within-round parallelization between FI iterations 2 and 3 of round 2. On the left side, operations for FI iteration 2 of round 2 start with XOR mechanism 944, which performs an XOR operation between the output data of XOR mechanism 940 and sub-key $KO_{2,2}$. The output data from XOR mechanism 944 is used by mechanism 948 to perform $FI_{2,2}$ function under the control of sub-key $KI_{2,2}$. The result of $FI_{2,2}$ operations is further XORed with the output data from XOR mechanism 942 through XOR mechanism 954. On the right side, operations for FI iteration 3 of round 2 start with XOR mechanism 946, which performs an XOR operation between the output data from XOR mechanism 942 and the sub-key $KO_{2,3}$. The result from XOR mechanism 946 is used by mechanism 950 to perform $FI_{2,3}$ operations under the control of sub-key $KI_{2,3}$. The output data from mechanism 950 is further XORed with the output data from XOR mechanism 954 to complete the cross-round FI parallelization between FI iterations 2 and 3 of round 2. The output data from XOR mechanism 954 forms the left side output 958 of round 2 and the output data from XOR mechanism 956 forms the right side output 960 of round 2. The left side output 958 and the right side output 960 are concatenated together to form the output 962 of round 2.

Typically, operations in an FI iteration in the FO function of a KASUMI round are performed in one clock cycle. Because of parallelization, each of within-round FI parallelization and cross-round parallelization may be performed in one clock cycle. This means that operations in round 1 and round 2, as shown in FIG. 9, may be performed in three clock cycles rather than 6 cycles.

Figure 10:
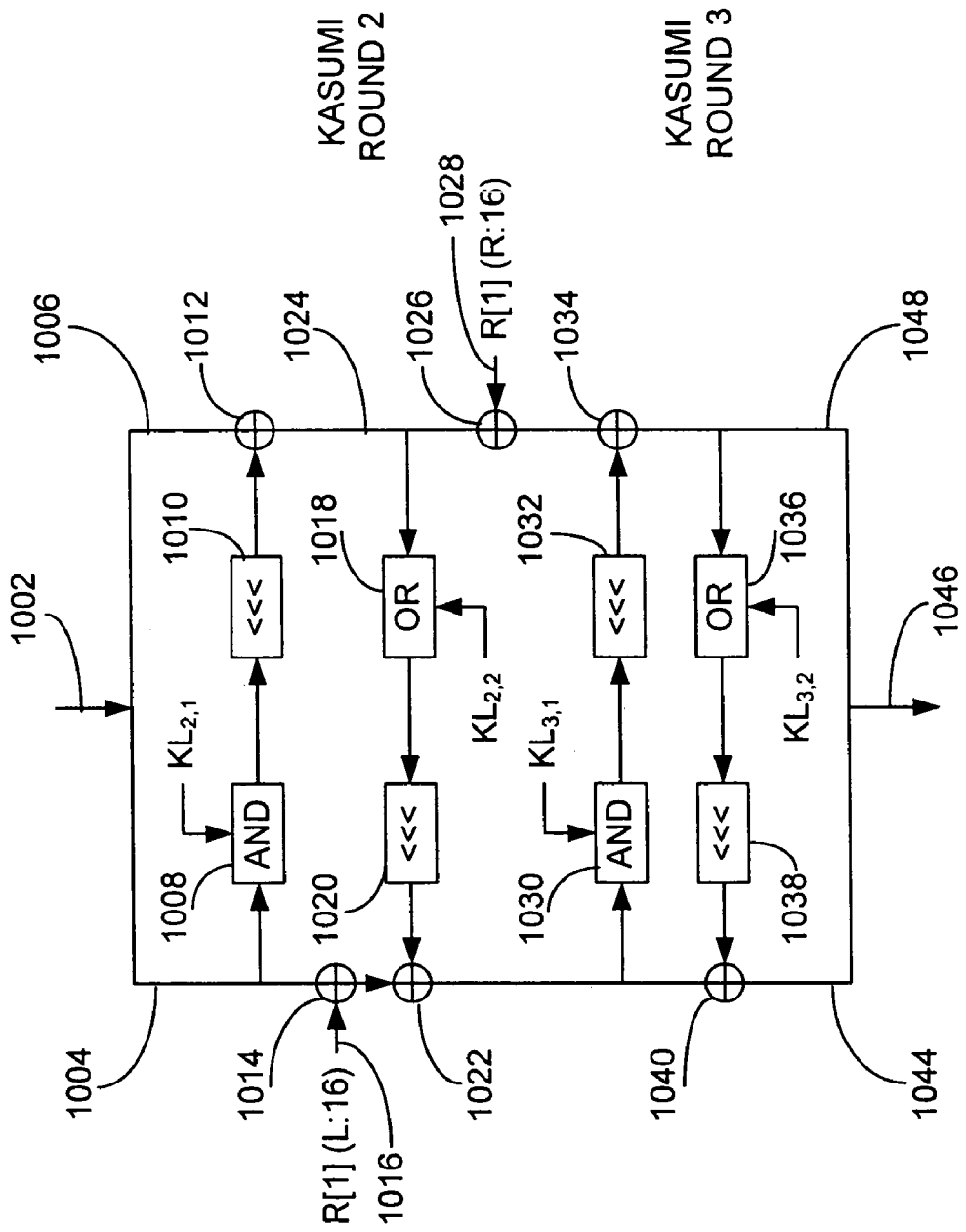
FIG. 10 is a diagram of an example implementation of two sequential FL functions in two consecutive KASUMI rounds.

FIG. 10 depicts an example implementation of two consecutive FL functions across two KASUMI rounds 2 and 3 ("cross-round FL-FL calculation"). This example implementation absorbs the extra XOR operation between FL2 and FL3, as shown in FIG. 2, into cross-round FL-FL calculation without causing extra delay. Because the extra XOR operation (32 bit) is a bit-wise operation, it can be replaced with two 16 bit XOR operations, performed by XOR mechanisms 1014 and 1026, respectively. One 32 bit input data, R[1], of the extra XOR operation is thus split into two 16 bit halves, with the left half 1016, R[1] (L:16), being an input to XOR mechanism 1014 and the right half 1028, R[1] (R:16), being an input to XOR mechanism 1026. Because of the "interchangeability" characteristic of an XOR operation, i.e., $(x \oplus y) \oplus z = x \oplus (y \oplus z)$, XOR mechanism 1014 can be put before XOR mechanism 1022 so that XOR mechanism 1014 is not in the critical path of the cross-round FL-FL calculation, that is, operations performed by 1014 and 1022 do not cause extra delay. It is not necessary to move XOR mechanism 1026 around because it is not in the critical path of the cross-round FL-FL calculation.

By absorbing the extra XOR operation between FL2 and FL3 into cross-round FL-FL calculation, the cross-round FL-FL calculation may be completed within one clock cycle. As shown in FIG. 10, a 32 bit input data 1002 to the cross-round FL-FL calculation is split into two 16 bit halves: the left half 1004 and the right half 1006. Mechanism 1008 performs a logic bit-wise "AND" operation between the left half 1004 and the sub-key $KL_{2,1}$. At the same time, XOR mechanism 1014 performs an XOR operation between the left half 1004 and R[1] (L: 16). The output data from mechanism 1008 is left-rotated by one bit by mechanism 1010. The output data from mechanism 1010 is XORed with the right half 1006 of the input data through XOR mechanism 1012. The output data from XOR mechanism 1012 is further XORed with R[1] (R:16) by XOR mechanism 1026. At the same time, mechanism 1018 performs a bit-wise logic "OR" operation between the output data from XOR mechanism 1012 and the sub-key $KL_{2,2}$. The output data from mechanism 1018 is subsequently left-rotated by one bit by mechanism 1020. The output data from mechanism 1020 is further XORed with the output data from XOR mechanism 1014.

Mechanism 1030 performs a bit-wise "AND" operation between the output data from XOR mechanism 1022 and the sub-key $KL_{3,1}$. The result of the "AND" operation is left-rotated by one bit by mechanism 1032. XOR mechanism 1034 performs an XOR operation between the output data from 1028 and the output data from 1032. The output data from 1034 forms the right side output 1048 of the cross-round FL-FL calculation. On the other hand, mechanism 1036 performs a bit-wise logic "OR" operation between the output data from 1034 and the sub-key $KL_{3,2}$. The result of the "OR" operation is left-rotated by one bit by mechanism 1038. XOR mechanism 1040 performs an XOR operation between the output data from 1022 and the output data from 1038 to produce the left side output 1044 of the cross-round FL-FL calculation. The left side output 1044 and the right side output 1048 are concatenated together to form a 32 bit output data 1046 for the cross-round FL-FL calculation.

Figure 11:
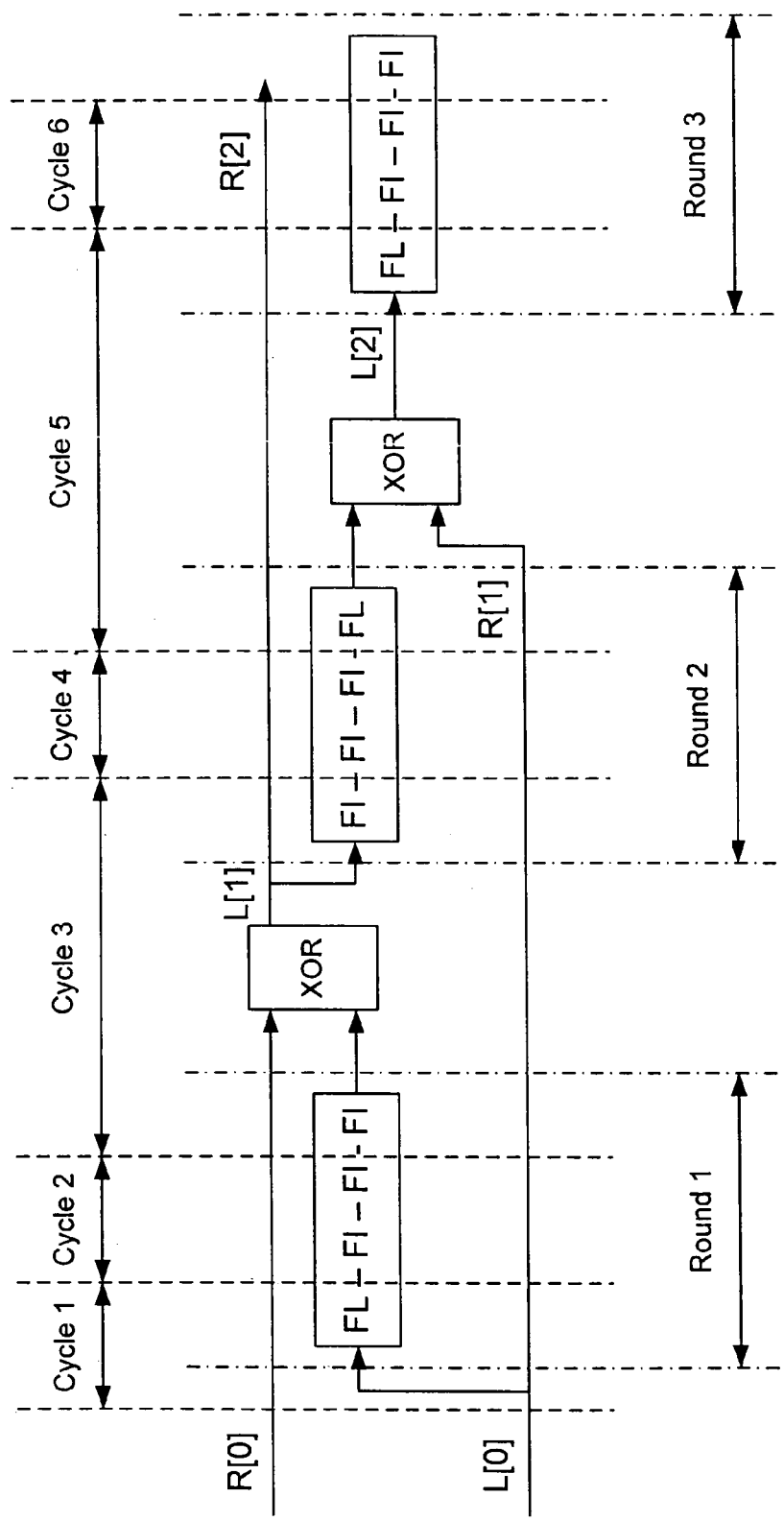
FIG. 11 is a diagram illustrating the relations between the KASUMI round and the processing cycle, according to an embodiment of the present invention.

FIG. 11 illustrates the relationship between KASUMI rounds and processing cycles. As shown in FIG. 2, an odd round comprises an FL function followed by an FO function and an even round comprises an FO function followed by an FL function. An FO function further comprises three FI functions. The first round begins with an FL function, which may be performed in cycle 1. The first FI function and the second FI function in round 1 may be performed in parallel in cycle 2 ("within-round FI parallelization"). The XOR operation between round 1 and round 2 may be pre-XORed so that the third FI function in round 1 and the first FI function in round 2 may be performed in parallel in cycle 3 ("cross-round FI parallelization"). The second FI function and the third FI function in round 2 may form another within-round FI parallelization and be performed in parallel in cycle 4. The XOR operation between round 2 and round 3 may be absorbed into the cross-round FL-FL calculation, which include operations needed by the FL function in round 2 and FL function in round 3, and may be performed in cycle 5. Because each of within-round FI parallelization, cross-round FI parallelization, and cross-round FL-FL calculation may be performed in one cycle, the eight KASUMI rounds may be performed in a total of 17 cycles.

Figure 12:
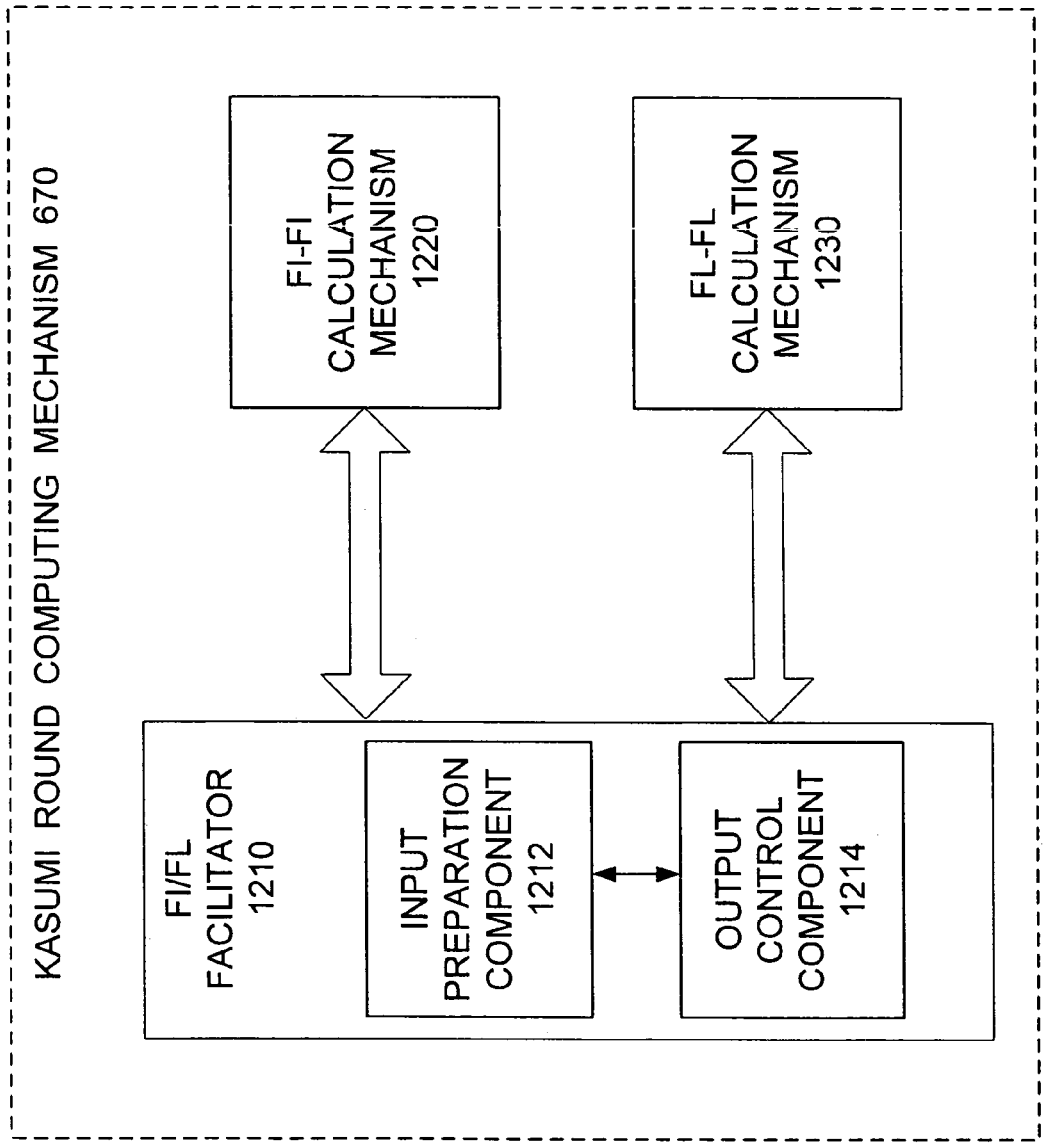
FIG. 12 is a diagram of an example implementation of the KASUMI ciphering process.

FIG. 12 depicts an example system that implements the KASUMI round computing mechanism 670 in FIG. 6 by employing FI-FI parallelization and cross-round FL-FL calculation, according to an embodiment of the present invention. The implementation of the KASUMI round computing mechanism comprises an FI/FL facilitator 1210, an FI-FI calculation mechanism 1220, and an FL-FL calculation mechanism 1230. The FI-FI calculation mechanism 1220 may be configured in such a way that both within-round FI parallelization and cross-round parallelization may be computed in a shared set of components. The FL-FL calculation mechanism 1230 may be configured for computing either a single FL function or two cross-round consecutive FL functions. The FI/FL facilitator 1210 may coordinate the FI-FI calculation mechanism and the FL-FL calculation mechanism so that these two mechanisms may be used to calculate all FI and FL functions involved in the eight KASUMI rounds. The FI/FL facilitator may comprise an input preparation component 1212 and an output control component 1214. The input preparation component 1212 may prepare input data for the FI-FI or FL-FL calculation mechanism. For example, it may split an input data into two halves for FI or FL functions. The output control mechanism 1214 may control the flow of output from the FI-FI or FL-FL calculation mechanism. For example, it may direct output data from one within-round FI parallelization to cross-round FI parallelization or cross-round FL-FL calculation, or vice versa. The output control mechanism may also form a final output data for the KASUMI ciphering process based on output data from the FI-FI and FL-FL calculation mechanisms.

Figure 13:
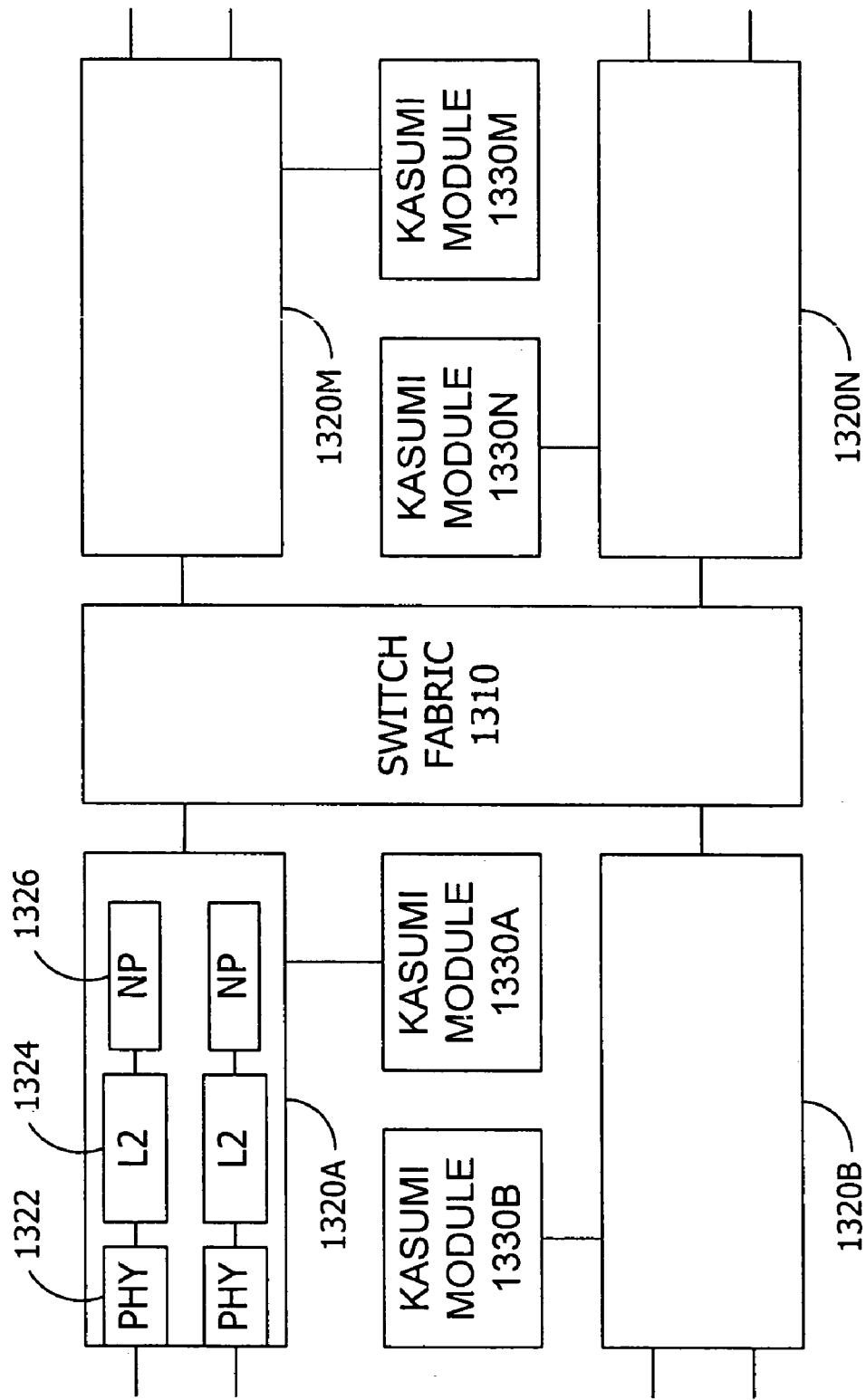
FIG. 13 is a diagram of a network system.

FIG. 13 depicts a network system that can perform KASUMI ciphering. The system may comprise a collection of line cards 1320 ("blades") interconnected by a switch fabric 1310 (e.g., a crossbar or shared memory switch fabric). Individual line cards may be located in the same physical location or different physical locations (e.g., different cities). The switch fabric, for example, may conform to Common Switch Interface (CSIX) or other fabric technologies such as HyperTransport, Infiniband, Peripheral Component Interconnect (PCI), Packet-Over-SONET (Synchronous Optic Network), RapidIO, and/or UTOPIA (Universal Test and Operations PHY (Physical Layer) Interface for ATM).

Individual line cards (e.g., 1320A) may include one or more physical layer (PHY) devices 1322 (e.g., optic, wire, and wireless PHYs) that handle communication over network connections. The PHYs translate between the physical signals carried by different network mediums and the bits (e.g., "0"-s and "1"-s) used by digital systems. The line cards 1320 may also include framer devices (e.g., Ethernet, Synchronous Optic Network (SONET), High-Level Data Link (HDLC) framers or other "layer 2" devices) 1324 that can perform operations on frames such as error detection and/or correction. The line cards 1320 shown may also include one or more network processors 1326 that perform packet processing operations for packets received via the PHY(s) 1322 and direct the packets, via the switch fabric 1310, to a line card providing an egress interface to forward the packet. Potentially, the network processor(s) 1326 may perform "layer 2" duties instead of the framer devices 1324.

The network processor(s) 1326 may be an Intel® Internet eXchange network Processor (IXP) or other network processors featuring different designs. The network processor features a collection of packet processing engines on a single integrated circuit. Individual engines may provide multiple threads of execution. Additionally, the network processor includes a core processor (that is often programmed to perform "control plane" tasks involved in network operations. The core processor, however, may also handle "data plane" tasks. The network processor 1326 also features at least one interface that can carry packets between the processor and other network components. For example, the processor can feature a switch fabric interface 1310 that enables the processor 1326 to transmit a packet to other processor(s) or circuitry connected to the fabric. The processor 1326 can also feature an interface that enables the processor to communicate with physical layer (PHY) and/or link layer devices (e.g., MAC or framer devices). The processor 1326 also includes an interface (e.g., a Peripheral Component Interconnect (PCI) bus interface) for communicating, for example, with a host or other network processors. Moreover, the processor 1326 also includes other components shared by the engines such as memory controllers a hash engine, and internal scratchpad memory.

As shown in FIG. 13, each line card 1320 may be operably coupled with at least one KASUMI module 1330 (e.g., 1330A) that performs KASUMI ciphering. In one embodiment, the KASUMI module may be separate from the line card. In another embodiment, the KASUMI module may be integrated with the line card. Also in one embodiment, the KASUMI module may be a part of the network processor 1326 or a part of the PHY 1322. Yet in another embodiment, the KASUMI module may be located in other network layers such as link layer, network layer, and/or application layer.

Although an example embodiment of the present invention is described with reference to diagrams in FIGS. 1-13, persons of ordinary skill in the art will readily appreciate that there may be many other alternative embodiments of the present invention. For example, the order of execution of the functional blocks or process procedures may be changed, and/or some of the functional blocks or process procedures described may be changed, eliminated, or combined.

In the preceding description, various aspects of the present invention have been described. For purposes of explanation, specific numbers, systems and configurations were set forth in order to provide a thorough understanding of the present invention. However, it is apparent to one skilled in the art having the benefit of this invention that the present invention may be practiced without the specific details. In other instances, well-known features, components, or modules were omitted, simplified, combined, or split in order not to obscure the present invention.

Embodiments of the present invention described herein may be implemented in circuitry, which includes hardwired circuitry, digital circuitry, analog circuitry, programmable circuitry, and so forth. They may also be implemented in computer programs. Such computer programs may be coded in a high level procedural or object oriented programming language. However, the program(s) can be implemented in assembly or machine language if desired. The language may be compiled or interpreted. Additionally, these techniques may be used in a wide variety of networking environments. Such computer programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus for implementing a KASUMI ciphering process substantially in hardware, comprising:
   a KASUMI round computing mechanism to compute eight KASUMI rounds required by the KASUMI ciphering process;
   a sub-key generator to generate sub-keys needed for computing each of the eight KASUMI rounds; and
   a controller to control the KASUMI round computing mechanism and the sub-key generator to cause the parallelization of computation of two consecutive FI functions across two KASUMI rounds among the eight KASUMI rounds to produce a final KASUMI output.

2. The apparatus of claim 1, wherein the KASUMI round computing mechanism comprises:
   an FI/FL facilitator to control computation of FI and FL functions in KASUMI rounds;
   an FI-FI calculation mechanism to compute two consecutive FI functions within a KASUMI round in parallel within one clock cycle and to compute two consecutive FI functions across two KASUMI rounds in parallel within one clock cycle; and
   an FL-FL calculation mechanism to compute FL functions in the KASUMI rounds.

3. The apparatus of claim 2, wherein the FI/FL facilitator comprises:
   an input preparation component to prepare input data for the FI-FI calculation mechanism and the FL-FL calculation mechanism; and
   an output control component to prepare output data of the FI-FI calculation mechanism and the FL-FL calculation mechanism for subsequent FI and FL calculations and to form a final output result of the KASUMI ciphering process.

4. The apparatus of claim 2, wherein the FL-FL calculation mechanism is capable of computing two consecutive FL functions across two KASUMI rounds within one clock cycle.

5. The apparatus of claim 1, further comprising:
   a KL selector operably coupled to the controller to select KL sub-keys for the use of the FL-FL calculation mechanism in computing KASUMI rounds;
   a KO selector operably coupled to the controller to select KO sub-keys for the use of the FI-FI calculation mechanism in computing the KASUMI rounds; and
   a KI selector operably coupled to the controller to select KI sub-keys for the use of the FI-FI calculation mechanism in computing the KASUMI rounds.

6. The apparatus of claim 1, wherein the controller controls KASUMI rounds computation through the FI/FL facilitator in the KASUMI round computation mechanism.

7. An apparatus for computing KASUMI rounds implemented substantially in hardware, comprising:
   an FI/FL facilitator to control computation of FI and FL functions in the KASUMI rounds;
   a FI-FI calculation mechanism to compute two consecutive FI functions in parallel within one clock cycle, the two consecutive FI functions including two consecutive FI functions within one KASUMI round and two consecutive FI functions across two KASUMI rounds; and
   a FL-FL calculation mechanism to compute FL functions in the KASUMI rounds.

8. The apparatus of claim 7, wherein the FI/FL facilitator comprises:
   an input preparation component to prepare input data for the FI-FI calculation mechanism and the FL-FL calculation mechanism; and
   an output control component to prepare output data of the FI-FI calculation mechanism and the FL-FL calculation mechanism for subsequent FI and FL calculations and to form a final output result of the KASUMI Rounds.

9. The apparatus of claim 7, wherein the FI/FL facilitator is capable of facilitating the FI-FI calculation mechanism and the FL-FL calculation mechanism to compute FI and FL functions required in the KASUMI Rounds.

10. The apparatus of claim 7, wherein the FL-FL calculation mechanism is capable of computing two consecutive FL functions across two KASUMI rounds within one clock cycle.

11. The apparatus of claim 7, wherein the FI-FI calculation mechanism pre-XORs an XOR operation between the two KASUMI rounds.

12. The apparatus of claim 7, wherein the FL-FL calculation mechanism is capable of computing an FL function within one clock cycle.

13. The apparatus of claim 7, wherein the FL-FL calculation mechanism absorbs an XOR operation between the two KASUMI rounds into FL function calculations without causing extra delay.

14. A method for implementing a KASUMI ciphering process, comprising:
   computing an FL function followed by computing an FO function for an odd KASUMI round, the FO function including three sequential FI functions with the first and the second FI functions computed in parallel within one clock cycle;
   computing an FO function followed by computing an FL function for an even KASUMI round, the FO function involving three sequential FI functions with the second and the third FI functions computed in parallel within one clock cycle; and
   computing the third FI function in an odd KASUMI round and the first FI function in an even KASUMI round that succeeds the odd KASUMI round in parallel within one clock cycle.

15. The method of claim 14, further comprising:
   computing an FL function in an even KASUMI round and an FL function in an odd KASUMI round that succeeds the even KASUMI round within one clock cycle.

16. The method of claim 15, further comprising:
   absorbing an XOR operation between the even KASUMI round and the odd KASUMI round into FL calculations without causing extra delay.

17. The method of claim 14, further comprising:
   pre-XORing an XOR operation between the odd KASUMI round and the even KASUMI round without causing extra delay.

18. A network system, comprising:
   a switch fabric;
   a plurality of line cards interconnected by the switch fabric; and
   a plurality of KASUMI modules, each operably coupled with a line card to perform KASUMI ciphering, a KASMUI module including:
      a KASUMI round computing mechanism to compute eight KASUMI rounds required by the KASUMI ciphering,
      a sub-key generator to generate sub-keys needed for computing each of the eight KASUMI rounds, and
      a controller to control the KASUMI round computing mechanism and the sub-key generator to cause the parallelization of computation of two consecutive FI functions two KASUMI rounds among the eight KASUMI rounds to produce a final KASUMI output.

19. The network system of claim 18, wherein the KASUMI round computing mechanism comprises:
- an FI/FL facilitator to control computation of FI and FL functions in KASUMI rounds;
- an FI-FI calculation mechanism to compute two consecutive FI functions within a KASUMI round in parallel within one clock cycle and to compute two consecutive FI functions across two KASUMI rounds in parallel within one clock cycle; and
- an FL-FL calculation mechanism to compute FL functions in the KASUMI rounds.

20. The network system of claim 18, wherein the FI/FL facilitator comprises:
- an input preparation component to prepare input data for the FI-FI calculation mechanism and the FL-FL calculation mechanism; and
- an output control component to prepare output data of the FI-FI calculation mechanism and the FL-FL calculation mechanism for subsequent FI and FL calculations and to form a final output result of the KASUMI ciphering process.

21. The network system of claim 18, further comprising:
- a KL selector operably coupled to the controller to select KL sub-keys for the use of the FL-FL calculation mechanism in computing KASUMI rounds;
- a KO selector operably coupled to the controller to select KO sub-keys for the use of the FI-FI calculation mechanism in computing the KASUMI rounds; and
- a KI selector operably coupled to the controller to select KI sub-keys for the use of the FI-FI calculation mechanism in computing the KASUMI rounds.

22. The network system of claim 18, wherein the controller controls KASUMI rounds computation through the FI/FL facilitator in the KASUMI round computation mechanism.

23. The network system of claim 18, wherein the FL-FL calculation mechanism is capable of computing two consecutive FL functions across two KASUMI rounds within one clock cycle.

* * * * *